United States Patent Office 3,257,401
Patented June 21, 1966

3,257,401
5-HYDROXY-2-METHYLCYCLOALKYL[d]
IMIDAZO[1,2-a]PYRIMIDINES
Hans A. Wagner, Skokie, Ill., assignor to G. D. Searle &
Co., Chicago, Ill., a corporation of Delaware
No Drawing. Filed June 18, 1964, Ser. No. 376,229
4 Claims. (Cl. 260—256.4)

This invention relates to 5-hydroxy-2-methylcycloalkyl [d]imidazo[1,2-a]pyrimidines and processes for the preparations thereof. More particularly, this invention provides new, useful, and unobvious chemical compounds of the formula

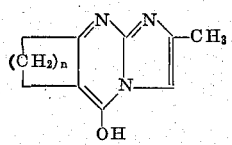

wherein $n$ represents a positive integer greater than 2 and less than 11.

The compounds to which this invention relates are characterized by valuable pharmacological properties. Thus, for example, they promote diuresis—both directly and by blocking the effects of desoxycorticosterone acetate on urinary sodium and potassium.

Preparation of the subject compounds proceeds by heating an appropriate 2-ethoxycarbonyl-1-cycloalkanone

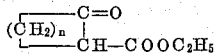

(wherein $n$ is defined as before) with guanidine carbonate in anhydrous ethanol to yield the corresponding 2-amino-5,6-polymethylenepyrimidin-4(3H)-one

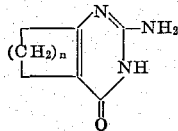

which, in turn, is converted to the selected 5-hydroxy-2-methylcycloalkyl[d]imidazo[1,2-a]pyrimidine hereof by heating in dimethylformamide with chloro-2-propanone. Alternatively, the 2-amino-5,6-polymethylenepyrimidin-4(3H)-one can be heated with 3-bromo-1-propyne in methanolic sodium methoxide to give the 3-propynyl derivative

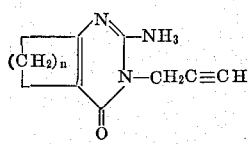

which is cyclized to the corresponding 5-hydroxy-2-methylcycloalkyl[d]imidazo[1,2 - a]pyrimidine by heating in aqueous acetic acid with a solution of mercuric acetate in aqueous acetic acid containing sulfuric acid.

The following examples describe in detail compounds illustrative of the present invention and methods which have been devised for their preparation. However, the invention is not to be construed as limited thereby either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

7,8 - dihydro - 5 - hydroxy - 2 - methyl - 6H - cyclopenta[d]imidazo[1,2 - a]pyrimidine.—To a solution of 6 parts of 2 - amino - 6,7 - dihydro - 3 - propynyl - 5H-cyclopenta[d]pyrimidin-4(3H)-one in 30 parts of aqueous 65% acetic acid is added a solution of 1 part of mercuric sulfate in a mixture of 10 parts of water, 1 part of concentrated sulfuric acid, and 15 parts of glacial acetic acid. The resultant mixture is stirred at 80° for 4 hours, then poured into 500 parts of water. The mixture thus obtained is neutralized with concentrated aqueous potassium hydroxide. Insoluble solids are filtered off, washed on the filter with water, dried in air, and recrystallized from ethanol to give 7,8 - dihydro - 5 - hydroxy - 2 - methyl - 6H - cyclopenta[d]imidazo[1,2-a]pyrimidine melting at 280–282°. The product has the formula

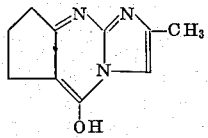

EXAMPLE 2

6,7,8,9 - tetrahydro - 5 - hydroxy - 2 - methylimidazo [1,2-b]quinazoline.—Substitution of 6 parts of 2-amino-5,6,7,8 - tetrahydro - 3 - propynylquinazolin - 4(3H)-one for the 2 - amino - 6,7 - dihydro - 3 - propynyl - 5H-cyclopenta[d]pyrimidin - 4(3H) - one called for in Example 1 affords, by the procedure there detailed, 6,7,8,9-tetrahydro - 5 - hydroxy - 2 - methylimidazo[1,2 - b] quinazoline melting at 282–284°. The product has the formula

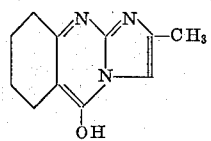

EXAMPLE 3

A. 2 - amino - 5,6,7,8,9,10,11,12,13,14 - decahydrocyclododeca[d]pyrimidin - 4(3H) - one.—A mixture of 97 parts of 2 - ethoxycarbonyl - 1 - cyclododecanone, 50 parts of guanidine carbonate, and 750 parts of anhydrous ethanol is heated at the boiling point with agitation under reflux for 16 hours, whereupon the ethanol is removed by vacuum distillation and the residue diluted with 1500 parts of water. The mixture thus obtained is neutralized with acetic acid. Insoluble solids are filtered off, washed with water, dried in air, and then washed with a 1:1 mixture of ether and acetone. The material thus isolated is 2-amino-5,6,7,8,9,10,11,12,13,14 - decahydrocyclododeca[d]pyrimidin-4(3H)-one melting above 300°.

B. 6,7,8,9,10,11,12,13,14,15 - decahydro - 5 - hydroxy-2 - methylcyclododeca[d]imidazo[1,2 - a]pyrimidine.—
A solution of 12 parts of 2-amino-5,6,7,8,9,10,11,12,13,-14 -decahydrocyclododeca[d]pyrimidin - 4(3H) - one and 6 parts of chloro-2-propanone in 100 parts of dimethylformamide is heated at the boiling point under reflux for 5 hours, then cooled and dissolved in 1000 parts of aqueous 2% sodium hydroxide. This solution is filtered, and the filtrate is neutralized with acetic acid. The solid which forms is filtered off, washed on the filter with water, dried in air, and recrystallized from ethanol to give 6,7,8,9,10,-11,12,13,14,15 - decahydro - 5 - hydroxy - 2 - methylcyclododeca[d]imidazo[1,2 - a]pyrimidine melting at approximately 249–250°. The product has the formula

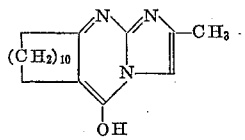

What is claimed is:
1. A compound of the formula

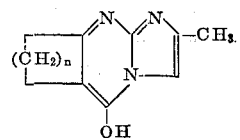

wherein $n$ represents an integer greater than 2 and less than 11.

2. 7,8 - dihydro - 5 - hydroxy - 2 - methyl - 6H - cyclopenta[d]imidazo[1,2 - a]pyrimidine.

3. 6,7,8,9 - tetrahydro - 5 - hydroxy - 2 - methyl - imidazo[1,2 - b]quinazoline.

4. 6,7,8,9,10,11,12,13,14,15 - decahydro - 5 - hydroxy-2 - methylcyclododeca[d]imidazo[1,2 - a]pyrimidine.

No references cited.

HENRY R. JILES, *Acting Primary Examiner.*